United States Patent
Cheng et al.

(10) Patent No.: US 10,915,507 B1
(45) Date of Patent: Feb. 9, 2021

(54) DATA CONVERSION HANDLER FOR A RUN-TIME EXECUTION ENVIRONMENT

(71) Applicant: Amazon Technologies, Inc., Reno, NV (US)

(72) Inventors: Pablo Puo Hen Cheng, Pomona, CA (US); Rosen Ognyanov Baklov, Lake Forest, CA (US)

(73) Assignee: Amazon Technologies, Inc., Seattle, WA (US)

( * ) Notice: Subject to any disclaimer, the term of this patent is extended or adjusted under 35 U.S.C. 154(b) by 943 days.

(21) Appl. No.: 14/465,150

(22) Filed: Aug. 21, 2014

(51) Int. Cl.
*G06F 16/21* (2019.01)
*G06F 9/455* (2018.01)
*G06F 16/25* (2019.01)

(52) U.S. Cl.
CPC ........ *G06F 16/211* (2019.01); *G06F 9/45516* (2013.01); *G06F 16/258* (2019.01)

(58) Field of Classification Search
CPC ............ G06F 17/30569; G06F 16/258; G06F 9/45516
See application file for complete search history.

(56) References Cited

U.S. PATENT DOCUMENTS

| 6,216,137 | B1* | 4/2001 | Nguyen | G06F 17/30297 |
| 6,704,747 | B1* | 3/2004 | Fong | G06F 16/252 |
| 9,460,198 | B1* | 10/2016 | Aman | G06F 17/30707 |
| 2004/0139122 | A1* | 7/2004 | Kanai | G06F 9/5027 |
| 2006/0036656 | A1* | 2/2006 | Mercer | G06F 17/30309 |
| 2012/0081378 | A1* | 4/2012 | Roy | G06T 15/005 345/522 |
| 2014/0164564 | A1* | 6/2014 | Hoofnagle | H04L 67/2823 709/217 |

* cited by examiner

*Primary Examiner* — Charles E Lu
(74) *Attorney, Agent, or Firm* — Davis Wright Tremaine LLP (57) ABSTRACT

A method and apparatus for data conversion in a run-time execution environment are provided. In the method and apparatus, a data request specifying a second schema for requested data is received. A data portion is retrieved from a data store, whereby the retrieved data has a first schema. On a condition that the first schema and the second schema are determined to be different, the data portion is converted to the second schema to produce a converted data portion, whereby the conversion is performed based at least in part on data conversion information. The converted data portion is then provided to the run-time execution environment for use in a run-time execution of the computer program.

20 Claims, 7 Drawing Sheets

DATA CONVERSION HANDLER FOR A RUN-TIME EXECUTION ENVIRONMENT

BACKGROUND

In many applications, such as game development, a schema associated with stored data that is accessed by computer programs may change. The change in the schema may be as a result of a computer program undergoing various stages of development and the change may affect the structure or layout of the data as well as various fields of the data. To manage the changes affecting data schema, conventional techniques call for the loading into storage compatible data that is suitable for each iteration of the computer program. However, such techniques are not optimum or memory efficient. Loading independent data sets that are each fit for one version or iteration of a computer program can be burdensome and hampers efficient program development. In addition, loading independent data sets may not result in an effective or efficient use of available storage resources as various multiples of a data set that are each compliant with a different schema take up available storage resources.

It is, therefore, often challenging to be able to efficiently perform backward and forward conversion of data set schema. In addition, it is also challenging to be able to perform the conversion during a run-time execution stage of a computer program that accesses the data sets and based at least in part on user-specified data conversion information.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include converting the schema for data from one version to another version during the run-time execution of a computer program. In many computer applications, such as applications that are built for computer game development, the schema of data (for example, data that is operated upon during game development) changes between various versions of the application. The schema may specify a structure associated with the data, such as a layout of the data. For example, the schema for tabular data comprising a plurality of columns or rows may indicate the type of data in each row or column, whereby the type of data may be a string, a numeral or a hexadecimal value, among others.

As the computer application is updated, the schema of the data used by the application (for example, data that is stored in a storage device) may be required to change to accommodate for changes in the application. It is desirable to enable both backwards and forwards conversion between various versions of data schema as that would alleviate the need to supply an independent data set for each version of the application. Instead, for an application that requires data to have a different schema than that of the data available for retrieval from a data store, data conversion information may be supplied. The data conversion information may specify one or more operations that are to be performed on the retained data to render the retained data is the desired schema. The one or more operations may logical operations or arithmetic operations, among others. The data conversion information, which may be used-specified, may be used during the run-time execution of the application to convert the data into a schema that is compatible with the running application.

A computer system, which may be a host or a server, among others, may be used to provide a run-time execution environment for an application. The application may include a plurality of executable instructions, whereby the data that is stored in a data store may be used as an input for the executable instructions (or, generally, as an operand for the executable instructions). The application may specify the schema of data of input and output data, whereby output data of the application may be stored in a data store, such as a hard drive or a hard disk, along with an indication of its schema. Input data that is requested by the application for processing may be retrieved from storage and converted into a schema that is compatible with the application prior to being provided to the run-time execution environment for processing.

During an execution of an application in the run-time execution environment, a data request may be made to a serializer. The data request may specify data that is sought to be provided to the run-time execution environment and may include an identity associated with the requested data. The data request may also include an indication of the schema of the requested data, whereby the indication may an identity associated with the schema such as a schema version number. The serializer may be any entity that is configured to evaluate the schema of the retrieved data to determine whether the schema matches the schema of the requested data. Retrieving the data may also include retrieving an indication (e.g., identifier) of the schema of the data, whereby the indication may be stored together with the retrieved data. The serializer may be configured to convert raw (for example, serial) data retrieved from storage into a run-time data object suitable for processing in the run-time execution environment and vice-versa. If the serializer determines that there is a schema mismatch, the serializer may be configured to cause the data to be transformed to render the retrieved data in the schema requested by the run-time execution as described herein. If, on the other hand, the serializer determines that the requested schema is the same as the schema of the stored data, the serializer may convert the retrieved data into a run-time data object and provide the run-time data object to the run-time execution environment.

Converting the schema of the retrieved data may be performed by a conversion handler. The conversion handler may any computing entity of the computer system executing the run-time environment or, generally, any other computer system. The conversion handler may be configured to receive data conversion information (for example, from a user) and utilize the data conversion information to convert the schema of the retrieved data. The data conversion information may specify one or more operations (such as transformations) that are to be performed on the retrieved data in order to convert the data to the requested schema. The conversion handler may retain an association between the data conversion information and the identities of the pre-conversion and post-conversion schemas to which the conversion information applies.

After determining that there is a schema mismatch, the serializer may complete the retrieval of the data from storage. Further, the serializer may make a call to the conversion handler to convert the data schema. The serializer may provide the data to the conversion handler along with an indication of the schema of the data. Upon receiving the call may identify data conversion information usable for converting the schema of the data. Additionally, the conversion handler may convert the schema of the data in accordance with the data conversion information. The conversion handler may then provide the converted data to the serializer, which may, in turn, supply the converted data to the run-time execution environment as a run-time data object.

The conversion handler may include a user conversion function and an automatic conversion module. The user conversion function may be used for schema conversion in accordance with user-provided data conversion information. Further, the user conversion function may be used to override data conversion performed by the automatic conversion module. The automatic conversion module, on the other hand, may be used for enforcing default rules on data conversion and for certain types of schema conversions that may be performed in the presence or absence of data conversion information. For example, the automatic conversion module may be used for the addition of default values or fields to the data or the removal of values or fields in accordance with the requested schema. If schema conversion necessitates field mapping or data translation, data conversion information may be required to be provided in order for schema conversion to be performed.

Figure 1:
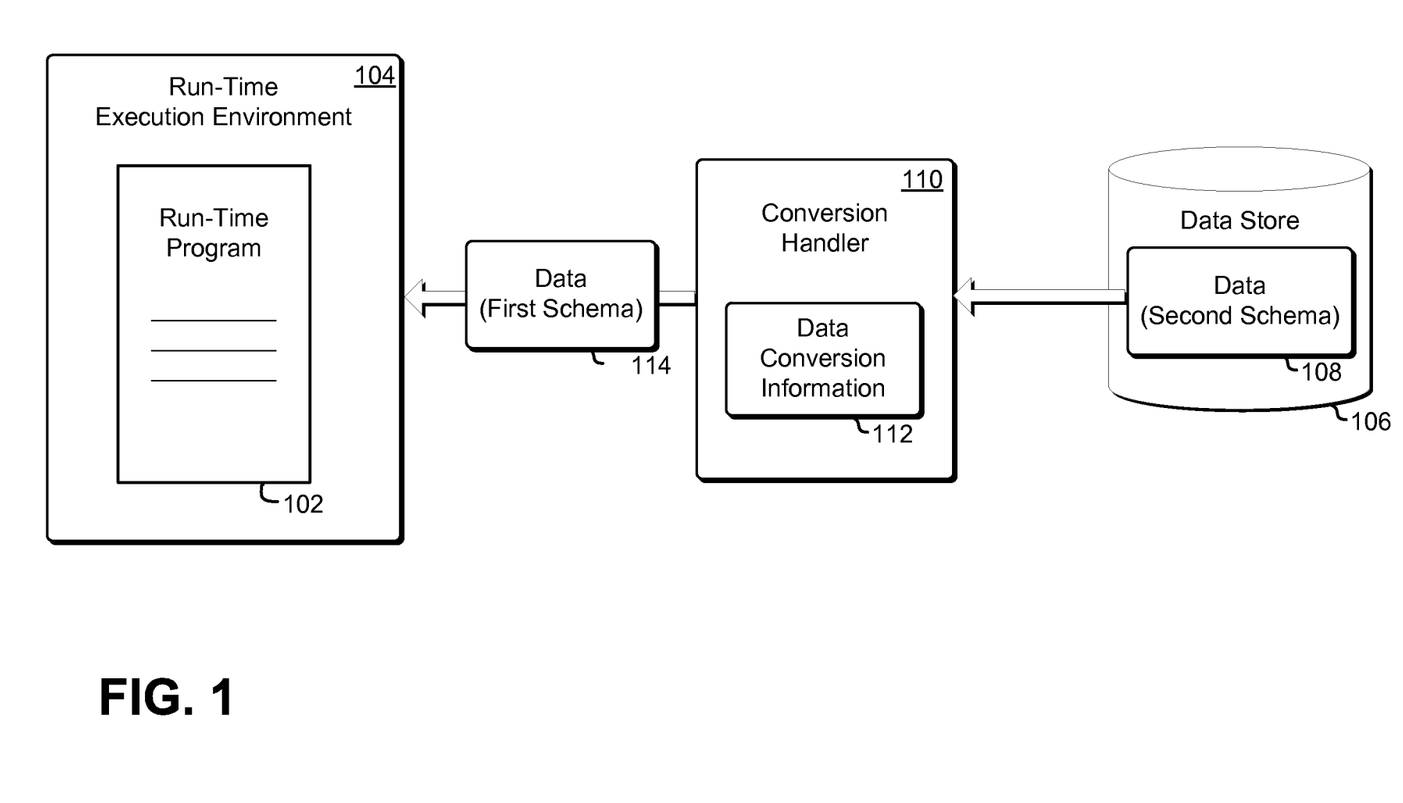
FIG. 1 shows an example of providing data schema conversion for a run-time execution of a computer program in accordance with at least one embodiment.

FIG. 1 shows an example of providing data schema conversion for a run-time execution of a computer program in accordance with at least one embodiment. A program (denoted as run-time program in FIG. 1 and referred to by the numeral 102) is undergoing the run-time stage of its execution in a run-time execution environment 104. The program 102 may include a plurality of executable instructions that are provided for a computer system for execution, whereby the computer system may be a host or a server, among others. The computer system also provides the run-time execution environment 104 in which the program 102 and associated instructions are executed. The run-time execution environment 104 may be enabled by the underlying computational functionality of the computer system, which may include one or more central processing units (CPUs) or graphics processing units (GPUs), among others.

The execution of the program 102 may be contingent upon data becoming available to the run-time execution environment 104 and operated upon. The data may have an associated schema and the program 102 may specify the schema of the requested data. The schema of data that is requested by the run-time execution environment 104 may be different than the schema of data 108 that is available for retrieval from a data store 106. As shown in FIG. 1, the run-time execution environment 104 may request data that is in accordance with a first schema, whereas the data 108 stored by the data store 106 is in accordance with a second schema. The data 108 may be retrieved from the data store 106 and provided to a conversion handler 110. The conversion handler 110 may retain data conversion information 112 that specifies one or more operations to be performed on the data 108 to convert its schema. The data conversion information 112 may be included with the program 102 or provided independently of the program 102. The conversion handler 110 may utilize data conversion information 112 for generating transformed data 114 based at least in part on the retrieved data 108. Following conversion, the transformed data 114 is provided to the run-time execution environment 104 for use in the run-time execution of the program 102.

Figure 2:
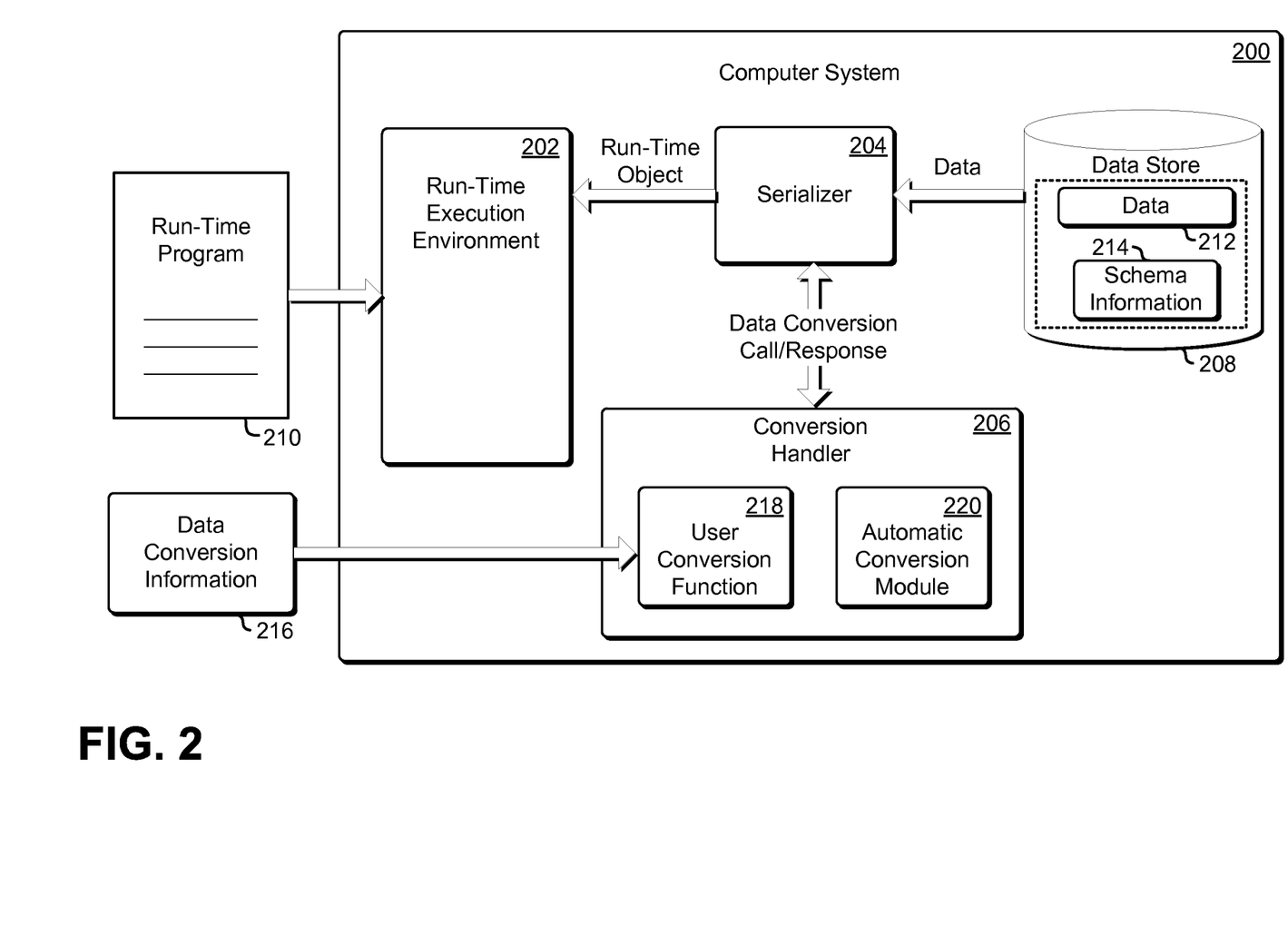
FIG. 2 shows an example of a computer system for processing structured data in accordance with at least one embodiment.

FIG. 2 shows an example of a computer system for processing structured data in accordance with at least one embodiment. The computer system 200 includes a run-time execution environment 202, a serializer 204, a conversion handler 206 and a data store 208. The conversion handler 206 is shown to include a user conversion function 218 and an automatic conversion module 220. A computer program 210 is provided to the computer system 200 for execution. The computer program 210 may be executed by the run-time execution environment 202 of the computer system 200. The computer system 200 may have computing resources, which may include computational resources, memory resources and networking resources. One or more central processing units (CPUs) or graphics processing units (GPUs), among others, may be used to provide the computational resources of the computer system 200, whereby the computational resources may enable performing various computational operations. The ability to perform the computational operations enables running the computer program 210 by executing the underlying executable instructions associated with the computer program 210 in the run-time execution environment 202 of the computer system. The execution of the run-time stage of the program 210 may be performed in the run-time execution environment 202. It is noted that although reference is made to run-time execution herein, the described techniques may be applicable to any execution stage.

The execution of the computer program 210 may require data to be provided to the run-time execution environment 202 for processing, whereby the data 212 may be stored by the data store 208 of the computer system 200. It is noted that although the data is shown to be stored in a local data store 208, in various embodiments the data may be stored remotely and may be accessible via a data connection over a network, such as the Internet. The data 212 may have an associated schema, whereby the schema may be a structure or a "blueprint" for the data 212. The schema may represent a layout of the data 212 or portions or fields thereof and may specify a type associated with the fields or portions. For example, the data 212 may be tabular data and the schema may specify a length of a table entry. Further, the schema may specify the type of data pertaining to each entry. For example, the schema may specify that the data includes strings, hexadecimal characters or alphanumeric characters, among others. The schema of the data 212 may specified by schema information 214 that is also stored in the data store 208. The data 212 and the schema information 214 may be associated or linked with one another, whereby the schema information 214 may be determined based at least in part on the data 212 or vice-versa.

The run-time execution of the computer program 210 in the run-time execution environment 202 may require that data having a particular schema to be provided. The data 212 stored in the data store 208 may meet the particular schema or may have a different schema. To facilitate program execution, if there is a mismatch between the schema of the data sought to be provided to the run-time execution environment 202 and the schema of the data 212 stored in the data store 208, the stored data 212 may be converted into a schema that is compatible with the run-time execution environment 202.

The conversion into the schema that is compatible with the run-time execution environment 202 may be performed by the conversion handler 206. The user conversion function 218 of the conversion handler 206 may be configured to perform schema conversion in accordance with data conversion information 216. Further, the automatic conversion module 220 may be configured to perform schema conversion in accordance with a set of default rules known to the automatic conversion module 220. The automatic conversion module 220 may perform schema conversion independently of the data conversion information 216. As shown in FIG. 2, data conversion information 216 is provided to the user conversion function 218 of the computer system 200. The data conversion information 216 may be provided along with the computer program 210 or independently of the computer program 210. The data conversion information 216 may specify a mechanism for converting the data 212 retained by the data store 208 to another schema that is compatible with the computer program 210. For example, the data conversion information 216 may specify one or more operations or manipulations to be performed on the data 212 to produce a second set of data. The one or more operations may be arithmetic, logical or conditional operations, among others. For example, the one or more operations may include combining data fields, splitting or dividing data fields and the like. In addition, the data conversion information 216 may specify translation or mapping of the data 212.

The data conversion information 216 may be provided for use in converting the data 212 to meet the schema or format utilized for executing the computer program 210. Providing the data conversion information 216 to the conversion handler 206 may be performed by a registration mechanism, whereby data conversion may be registered with the conversion handler 206 if processing the computer program 210 requires data that has a schema or a format that is different than that of the data 212 stored by the data store 208. The conversion handler 206 may be configured to utilize the computational resources of the computer system 200.

The conversion handler 206 may be equipped to receive a request for data conversion, whereby the request may indicate the data that is sought to be converted. In addition, the request may indicate an identity associated with the schema of the provided data as well as an identity associated with the schema of the sought output data. The conversion handler 206 may provide the data to the automatic conversion module 220 for conversion based at least in part on default rules. For example, the automatic conversion module 220 may identify one or more rules for converting the data between two schema versions. The one or more rules may specify data to be added or removed to accomplish schema conversion. For instance, if a version of a schema does not include certain data fields or data types present in another version of the schema, the data may be removed by the automatic conversion module 220. Further, other data may be added based at least in part on default rules. Further, the automatic conversion module 220 may cause the data to be reordered or may change the organization of the data.

Following schema conversion, by the automatic conversion module 220, the data may be provided to the serializer 204 for use in the run-time execution environment 202. However, if user-specified data conversion information 216 is supplied to the user conversion function 218, the data may be provided to the user conversion function 218 for further schema conversion. Alternatively, when the data conversion information 216 is supplied to the user conversion function 218, the data may not be provided to the automatic conversion module 220 and may instead be directly provided to the user conversion function 218. The user conversion function 218 of the conversion handler 206 may have access to the data conversion information 216. The user conversion function 218 may evaluate the data and convert the data to the sought after schema in accordance with the data conversion information 216.

In response to receiving a request for data, the serializer 204 retrieves the data 212 and associated schema information 214 from the data store 208. The serializer 204 evaluates the schema information 214 to determine whether the schema of the retrieved data 212 is compatible with that requested by the run-time execution environment 202. If the schemas are compatible (for example, the schemas are identical), the serializer 204 may convert the retrieved data into a run-time data object and provide the run-time data object to the run-time execution environment 202. The serializer 204 performs serialization and deserialization of data. When the data 212 is retrieved from the data store 208, the data 212 is deserialized and provided to the run-time execution environment 202 as a run-time data object. Conversely, an output run-time data object of the run-time execution environment 202 may be serialized, whereby a run-time data object is converted into a version of data that is suitable for storage.

Serializing data may include creating a representation of a data object that may be transferred serially or bit-by-bit, whereby data is written as a sequence of bits or strings or as raw binary data. Further, serialized data may have any form, such as Extensible Markup Language (XML), JavaScript Object Notation (JSON), Binary JSON (BSON) or binary. In addition, serialization may be used to convert a hierarchical object, such as a data tree, into a serial or flat representation. Deserialization is the reversal of the serialization process, where, for example, raw data that is retrieved from storage or received over a network is reconstructed into a run-time data object.

If it is determined that the schema of the data 212 is not compatible with the requested schema, the serializer 204 may be configured to complete the retrieval of the data 212 from the data store 208, whereby the retrieved data may be in a binary format or a raw format. Further, the serializer 204 may convert the data into an intermediate format, such as an intermediate data structure or a data tree format, and provide the data to the conversion handler 206. The data tree may have a plurality of nodes including a topmost root node and leaf nodes. Further, the data tree may have subtrees of data, among others. The intermediate format may be different from a run-time data object format of the data used in the run-time execution environment 202 and a raw or binary format used to store the data in the data store 208. The intermediate format of the data may be configured with an indication of its associated schema, whereby a party receiving the data may determine the schema associated with the data. The serializer 204 may then make a request or a call to the conversion handler 206 to convert the data into a format that is compatible with the run-time execution environment 202. The serializer 204 may further be configured to identify a user conversion function 218 of the conversion handler 206 that is tasked with converting the particular schema. The identified user conversion handler 206 may have received the data conversion information 216, whereby the data conversion information 216 may have been specified as part of the computer program 210 or independently of the computer program 210. The user conversion function 218 receives the data provided by the serializer 204 or automatic conversion module 220 and converts the data 212 to a schema compatible with the computer program 210. The conversion may be performed in accordance with the data conversion information 216. For example, the data conversion information 216 may specify operations that are to be performed on the received data to convert the schema associated with the data. The user conversion function 218 may perform the specified operations on the data to produce an outcome and provide the outcome to the serializer 204. The serializer 204 may receive the data from the conversion handler 208 or associated user conversion function 218 or automatic conversion module 220, The serializer 204 may, in turn, convert the data from the intermediate format to a run-time data object and the data to the run-time execution environment 202.

The run-time execution environment 202 may be any environment in which the run-time stage of an execution of the computer program 210 is performed. The implementation of the run-time execution environment 202 may be facilitated by the computing functionality of the computer system 200. The computer program 210 may be a collection of computer instructions, subroutines or function calls, among others. The execution of the computer program 210 may require one or more operations to be performed on data. As described herein, proper execution of the computer program 210 in the run-time execution environment 202 may require that the data is provided in a format in which the computer program was designed to use or handle. Providing the data in a format that is different than that which the computer program 210 was intended to receive may cause the execution of the computer program to result in unexpected outcomes or may make the computer program 210 unreliable. For example, if the computer program 210 operates on data that represents the time as measured in seconds that elapsed from a specified time reference whereas the computer program 210 is provided with the time as measured in minutes, the computer program 210 may not execute properly or produce an intended outcome.

Figure 3:
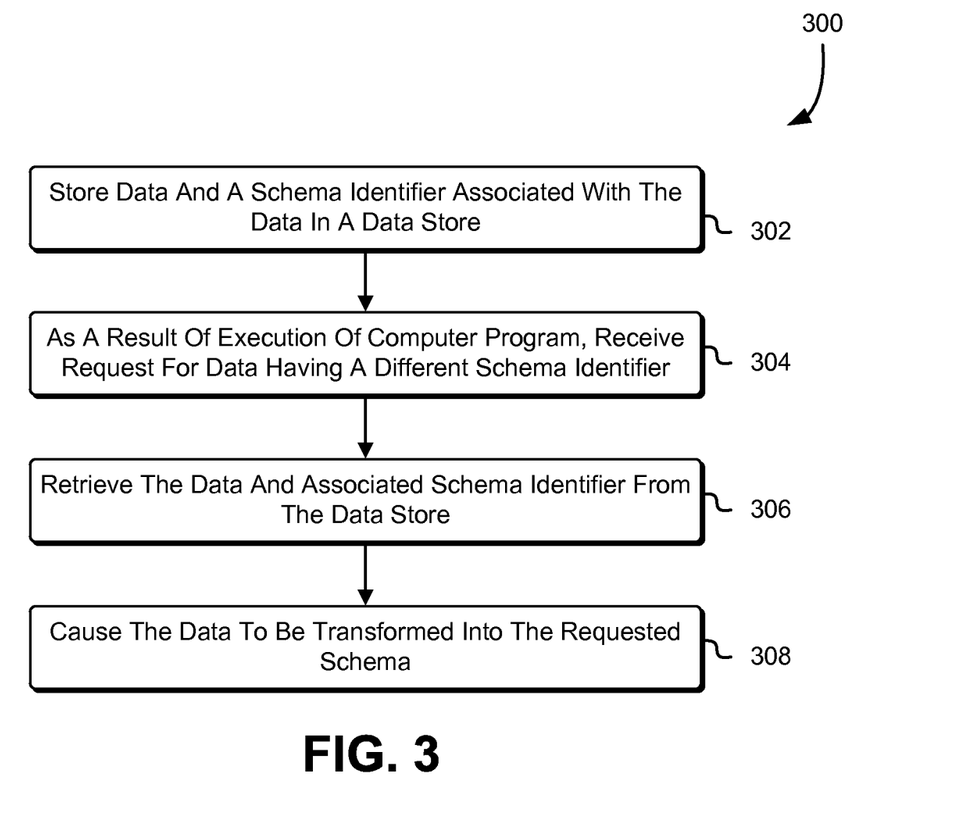
FIG. 3 shows an example of a method for schema conversion of data in accordance with at least one embodiment.

FIG. 3 shows an example of a method for schema conversion of data in accordance with at least one embodiment. In the process 300, a serializer, such as the serializer described with reference to numeral 204 in FIG. 2, stores 302 data and a schema identifier associated with the data in a data store. The data may be an outcome of the execution of a computer program and has an associated schema that may be specified by the computer program. When storing the data in the data store, the serializer may cause the schema information or an identifier associated with the schema to be stored along with the data, whereby the data and schema identifier or the schema information may be linked or associated with one another in the data store.

As a result of an execution of a computer program in a run-time execution environment, such as the run-time execution environment described with reference to numeral 202, the serializer receives 304 a data request for data having a different schema identifier than the schema identifier of the stored data. The computer program under execution may be configured to specify schema information or a schema identifier of data that is sought to be read from the data store or written to the data store. A schema identifier may be a version number of the schema of the data, whereby various iterations of data processing may result in a schema becoming outdated and superseded by a new schema.

The serializer retrieves 306 the data and associated schema identifier in response to the data request. The serializer also causes 308 the data to be transformed into the requested schema. A conversion handler, such as the conversion handler described with reference to numeral 206 in FIG. 2, may be responsible for converting data from one schema to another. The serializer may cause the retrieved data to be provided to the conversion handler and the conversion handler may convert the data in accordance with data conversion information included with or accompanying a computer program. Converting the data to meet a requested schema may include performing any type of operation on the data including logical or arithmetic operations. For example, some data fields may be discarded by an automatic conversion module, such as the automatic conversion module described with reference to numeral 220 in FIG. 2, whereas others may be operated upon by a user conversion function, such as the user conversion function described with reference to numeral 218 in FIG. 2, to produce the data meeting the sought after schema.

Figure 4:
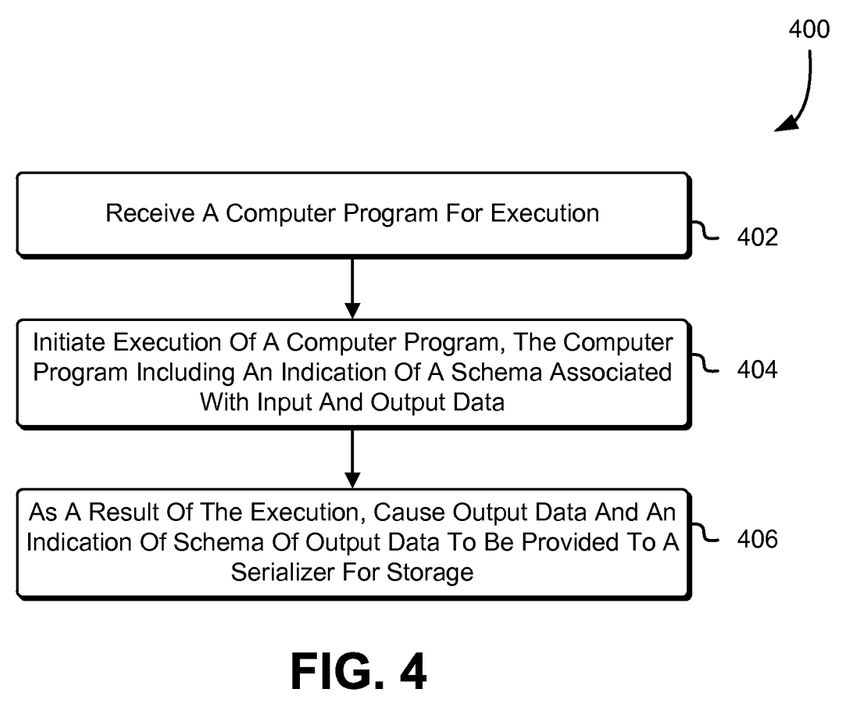
FIG. 4 shows an example of a method for executing a computer program in a run-time execution environment in accordance with at least on embodiment.

FIG. 4 shows an example of a method for executing a computer program in a run-time execution environment in accordance with at least on embodiment. In the process 400, a run-time execution environment, such as the run-time execution environment described with reference to numeral 202 in FIG. 2, receives 402 a computer program for execution. The run-time execution environment initiates 404 execution of the computer program. As described herein, the computer program includes an indication of a schema associated with input and output data. The input data may be any data that is utilized in executing the computer program. For example, the input data may be used in operands of executable instructions of the computer program.

The computer program may be a computer game application and the data may be vertex data that is used to render two-dimensional surfaces or three-dimensional objects. The schema of the data may be subject to modification as the computer game is developed or used. Accordingly, as opposed to reloading a new set of data every time the schema of the data changes, it is more efficient to configure the computer program to specify the schema associated with input or output data. Outputted data may be provided with an indication of the schema and the data may be stored together with the indication of the schema. Further, a request for data may also be submitted with an indication of the schema of the data, whereby if there is a mismatch between the schema of the requested data and the schema of the stored data, the stored data may be converted to the schema of the requested data. Data conversion, as described herein, may be performed in accordance with received data conversion information. As a result of the execution of the computer program, the run-time execution environment causes 406 output data and an indication of the schema of the output data to be provided to a serializer for storage. The provided data may be stored together with an indication of the schema of the data.

Figure 5:
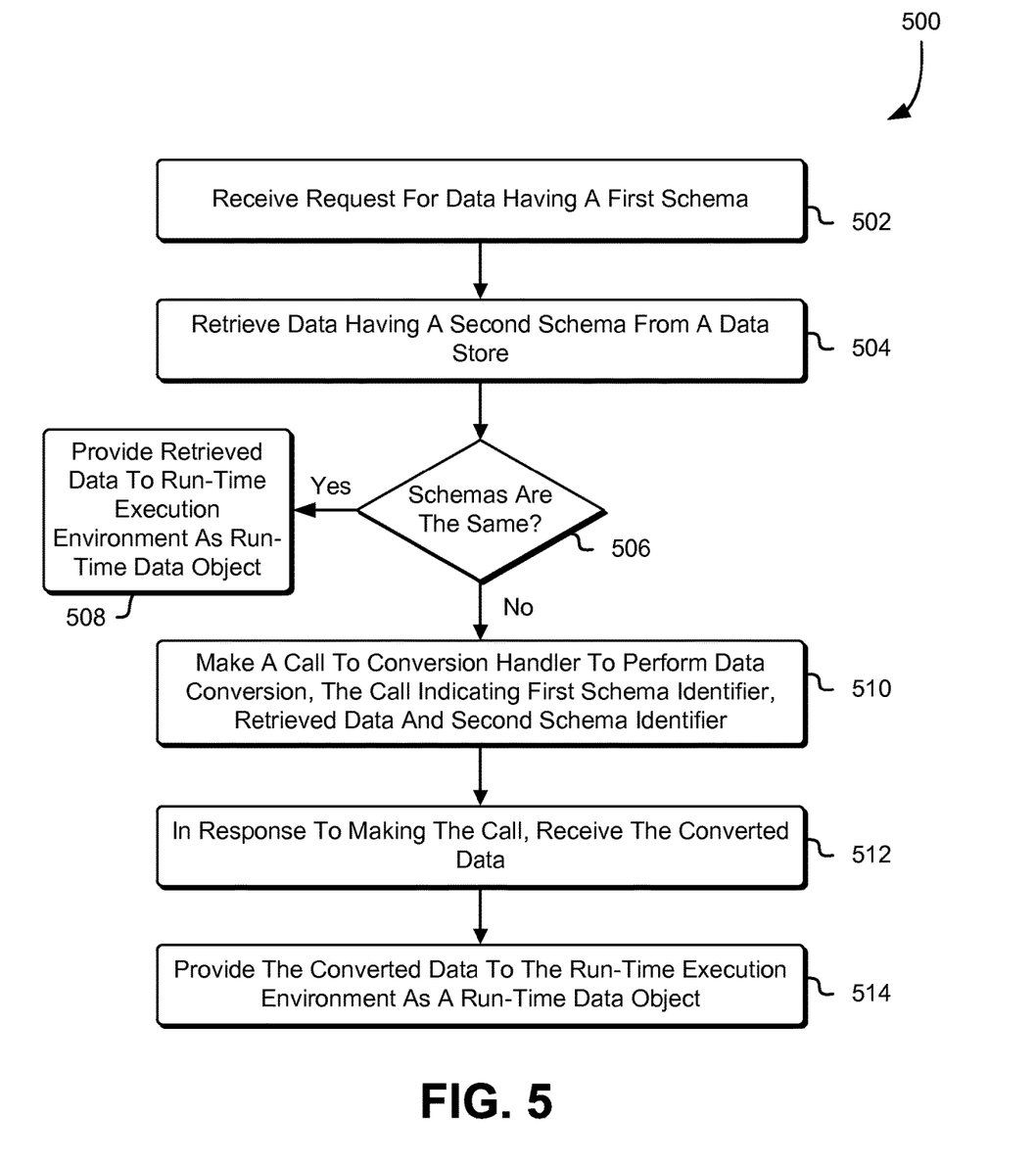
FIG. 5 shows an example of a method for providing a run-time data object to a run-time execution environment in accordance with at least on embodiment.

FIG. 5 shows an example of a method for providing a run-time data object to a run-time execution environment in accordance with at least on embodiment. In the process 500, a serializer, such as the serializer described with reference to numeral 204 in FIG. 2, receives 502 a request for data having a first schema. The request may be received from a run-time execution environment, such as the run-time execution environment described with reference to numeral 202 in FIG. 2. The run-time execution environment may make the request as a result of executing a computer program. For example, evoked executable instructions of the computer program may specify that data is to be retrieved and provided for processing.

In response to receiving the request, the serializer retrieves 504 the data from a data store, whereby the retrieved data has a second schema. The schema of the retrieved data may be determined based at least in part on metadata stored with the retrieved data, whereby the metadata may indicate the schema of the data. The serializer then determined 506 whether the schema of the requested data is the same as the schema of the retrieved data. If a positive determination is made, schema conversion may be determined to be unnecessary. Further, the serializer provides 508 the retrieved data to the run-time execution environment as a run-time data object.

If a negative determination is made, the serializer makes 510 a call to a conversion handler, such as the conversion handler described with reference to numeral 206 in FIG. 2, to perform data conversion. The call may provide the retrieved data as well as an identifier associated with the first schema and an identifier associated with the second schema identifier. The data may be provided to the conversion handler in an intermediate format, such as a data tree format. The provided identifiers may be used by the conversion handler to identify a transformation or user conversion function to be used in converting the data from the second schema to the first schema. The transformation or conversion function may be based at least in part on data conversion information that may be received as part of a program or provided independently of the program to facilitate execution of the program. The conversion handler performs the data conversion and provides the converted data to the serializer. Converting the data may be performed by an automatic conversion function based at least in part on default rules or by a user conversion function based at least in part on received data conversion information. As shown in FIG. 5, in response to making the call, the serializer receives 512 the converted data from the conversion handler. Further, the serializer provides 514 the converted data to the run-time execution environment as a run-time data object.

Figure 6:
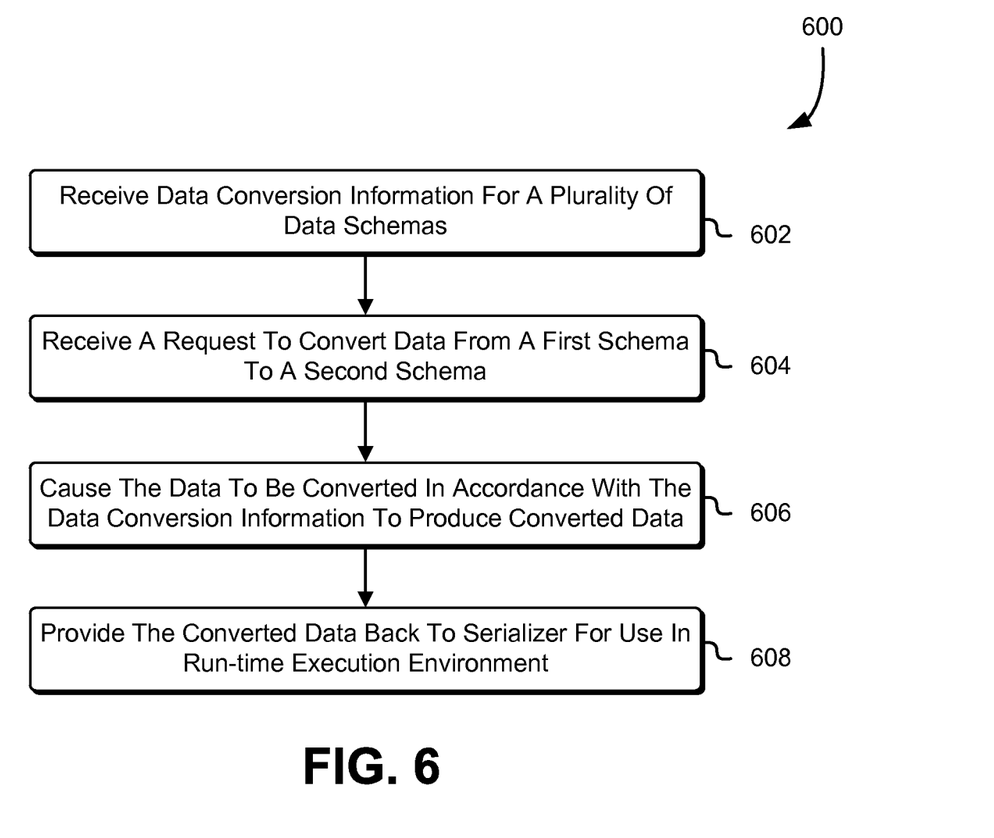
FIG. 6 shows an example of a method for converting data schema in accordance with at least one embodiment.

FIG. 6 shows an example of a method for converting data schema in accordance with at least one embodiment. In the process 600, a conversion handler receives 602 data conversion information for a plurality of data schemas. The conversion information may be received due at least in part to initiating the execution of a program or the potential for the execution to be initiated. The data conversion information may specify the manner in which the data is to be converted from a first schema to a second schema. For example, the data conversion information may specify one or more logical or mathematical operations that are required to be performed on the data as represented by the first schema to convert the data to a second schema. The conversion handler may store the data conversion information and associate the data conversion information with an identifier of the first schema or an identifier of the second schema. Accordingly, if a request to convert the data is received, the proper conversion logic may be identified based at least in part on an identity of the schema of the data that is sought to be converted.

The conversion handler receives 604 a request to convert data from the first schema to the second schema. As described herein, the request may include the data (for example, in an intermediate format) as well as an identifier associated with the first schema and the second schema. The conversion handler then causes 606 the data to be converted in accordance with the data conversion information, whereby converted data is produced. Causing the data to be converted may include performing one or more operations that are specified by the data conversion information on the received data. Further, before converting the data in accordance with the data conversion information, an automatic conversion module may be used to transform the data in accordance with default rules. In addition, if data conversion information is not specified, the outcome of the automatic conversion module may be used. Following generating the data in accordance with the second schema, the conversion handler provides 608 the converted data back to the serializer for use in the run-time execution environment.

In various embodiments, a plurality of data conversion functions may be retained, whereby each data conversion function may be used to transform data between two schemas. Data versioning may be implemented using the plurality of data conversion functions, whereby each data conversion function may be used to transform data to a subsequent or prior version. For example, a first data conversion function may be used to transform the data from a first version to a second version, whereas a second data conversion function may be used to transform the data from the second version to a third version and so on. Successive application of more than one data conversion functions may be employed to provide for both forward and backward versioning. For example, successive application of the first data conversion function and the second data conversion function may be used to convert the data from the first version to the third version.

The same or different data conversion functions may be used to enable backward compatibility. For example, an inverse of a data conversion function may be used to counteract the application of the data conversion function to produce a preceding version of the data. Continuing with the above example, an inverse of the second data conversion function may be used to transform the data from the third version to the second version and an inverse of the first data conversion function may be used to transform the data from the second version to the first version. Successive application of more than one data conversion functions may be employed to provide for both forward and backward versioning. In some embodiments, the inverse data conversion function may not be determinable based at least in part on a retained data conversion function. Accordingly, independent forward and backward data conversion functions may be required to be kept to ensure that both backward and forward compatibility for data versions are maintained.

As described herein, the conversion handler may be used to store the plurality of data conversion functions and associate each data conversion function of the plurality of data conversion functions with a version number of both input and an output schema. The plurality of data conversion functions may then be used to provide the run-time execution environment with data having the desired schema. For example, a request for data that is received from the run-time execution environment may specify the desired version of the data schema. The conversion handler may determine the appropriate data conversion functions to apply based at least in part on the desired version of the data schema and the associated schema version of the data that is retained in memory. For example, if a fourth version of the schema is requested and the data that is stored in a data store is in accordance with the first version of the schema, the conversion handler may successively apply three data conversion functions to produce the requested data schema.

Figure 7:
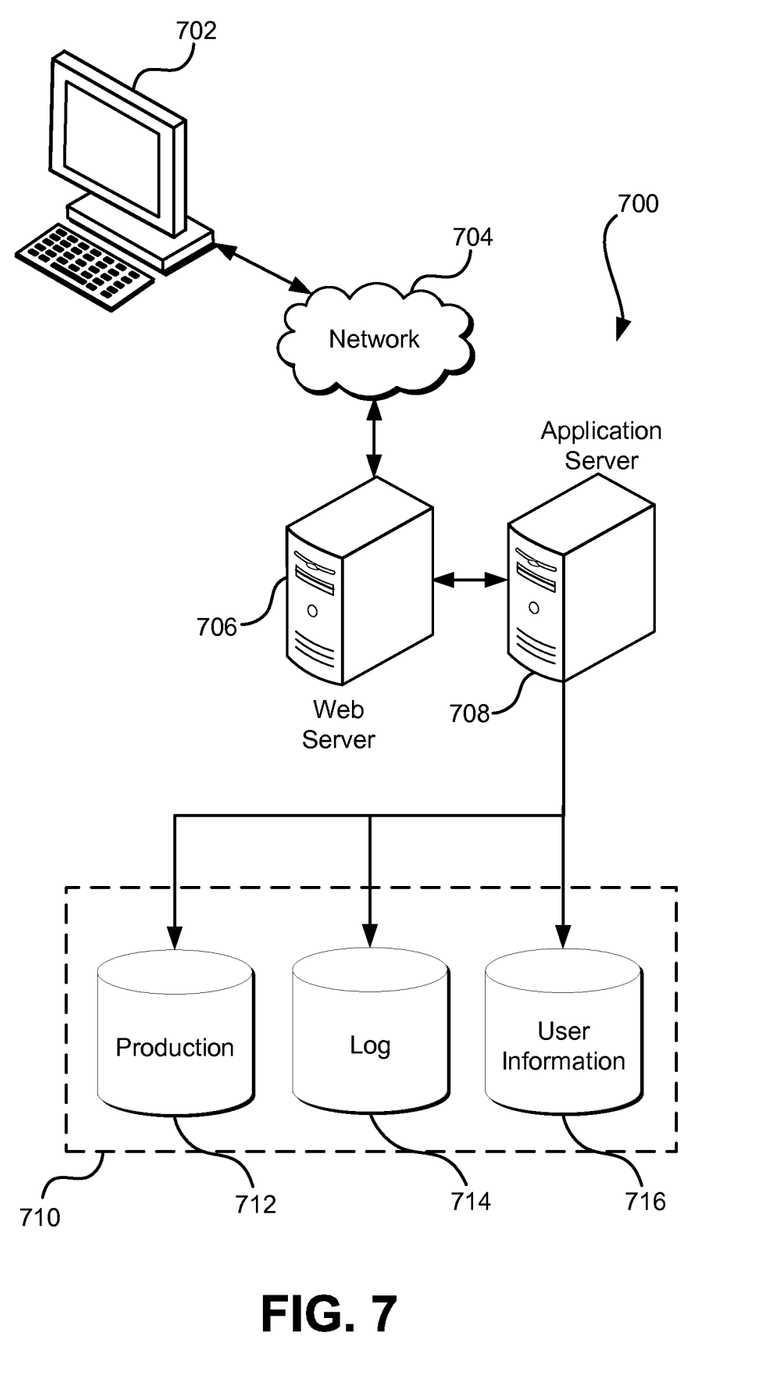
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, at a conversion handler, data conversion information for a plurality of data schemas including a first schema and second schema, the data conversion information specifying operations that convert data between data schemas of the plurality of data schemas and obtained due at least in part to initiating execution of a computer program, where the first schema is associated with a previous version of the computer program;
    obtaining, from a run-time execution environment, a data request for vertex data made as a result of executing the computer program in the run-time execution environment, the data request specifying the second schema for requested data, the second schema being compatible with the computer program, the second schema being further indicated by one or more instructions of the computer program;
    retrieving serialized data from a data store, the serialized data being structured in accordance with the first schema and being stored together with an indication of the first schema;
    generating a determination that the first schema and the second schema are different based at least in part on the first schema being associated with the previous version of the computer program;
    converting, based at least in part on the determination, the serialized data to the second schema to produce converted serialized data by making a first request to the conversion handler to convert the serialized data, fulfilling the first request causing the conversion handler to convert the serialized data from the first schema to the second schema according to the data conversion information, where converting the serialized data from the first schema to the second schema comprises at least one intermediate schema of the plurality of data schemas and the first schema and the at least one intermediate schema are applied successively to generate the second schema, the first request including the serialized data and the indication of the first schema;

causing a serializer to produce a run-time data object by at least deserializing the converted serialized data to generate raw data that is reconstructed into the run-time data object, where the run-time data object encodes the vertex data rendered by the graphics processing unit within the run-time execution environment; and providing the run-time data object to the run-time execution environment.

2. The computer-implemented method of claim 1, wherein the converted serialized data is in an intermediary format that is different from a format of the serialized data and a format of the run-time data object.

3. The computer-implemented method of claim 1, wherein the computer-implemented method further comprises:

maintaining an association between the data conversion information and identities associated with the first schema and the second schema; and identifying the data conversion information based at least in part on the indication of the first schema and the association.

4. The computer-implemented method of claim 1, wherein the run-time execution environment is enabled by computational functionality of one or more graphics processing units.

5. A system, comprising:

one or more processors; and memory to store instructions that, as a result of execution by the one or more processors, cause the system to:

receive a first request for vertex data, the first request specifying a first schema for the vertex data that is compatible with a computer program;

submit, to a data store, a second request to retrieve the vertex data, the vertex data maintained in a second schema and associated with an indication of the second schema, where the second schema is associated with a previous version of the computer program;

obtain, from the data store in response to the second request, serialized data corresponding to the vertex data;

generate a determination that the first schema of the vertex data and the second schema are different;

as a result of the determination, provide a data conversion call to a conversion entity, the data conversion call including the serialized data and an indication of the first schema;

obtain, in response to the data conversion call, transformed serialized data generated based at least in part on the serialized data and data conversion information specifying a manner in which the second schema is converted to at least one intermediate schema prior to conversion to the first schema by at least causing the conversion entity to render the vertex data in the first schema and generate the transformed serialized data based at least in part on the vertex data rendered in accordance with the first schema; and make the transformed serialized data available to the computer program by at least deserializing the transformed serialized data to generate the vertex data in a format matching the first schema.

6. The system of claim 5, wherein the instructions that cause the system to make the transformed serialized data available to the computer program further include instructions that, as a result of being executed by the one or more processors, cause the system to provide the transformed serialized data to the computer program as a run-time data object.

7. The system of claim 5, wherein the data conversion information specifies one or more operations to be performed on the serialized data to generate the transformed serialized data that is compliant with the first schema.

8. The system of claim 5, wherein the memory further includes instructions that, as a result of being executed by the one or more processors, cause the system to receive a registration message indicating the data conversion information, the registration message specifying that the data conversion information used to convert the vertex data is compliant with the second schema to generate second data compliant with the first schema.

9. The system of claim 5, wherein the memory further includes instructions that, as a result of being executed by the one or more processors, cause the system to receive the first request in response to initiating run-time execution of the computer program.

10. The system of claim 5, wherein the memory further includes instructions that, as a result of being executed by the one or more processors, cause the system to:

maintain an association between the data conversion information and an identity associated with the first schema and an identity associated with the second schema; and identify the data conversion information based at least in part on the indication of the second schema and the association.

11. The system of claim 5, wherein the memory further includes instructions that, as a result of being executed by the one or more processors, cause the system to:

receive a third request for the vertex data, the third request specifying a schema associated with the vertex data and third data;

retrieve the third data from the data store;

determine that the schema associated with the third data and the first schema are the same; and provide the third data to the computer program as a run-time data object.

12. The system of claim 5, wherein deserializing the transformed serialized data further comprises obtaining raw data from the transformed serialized data and reconstructing the raw data into a run-time data object.

13. A non-transitory computer-readable storage medium storing executable instructions that, as a result of being executed by one or more processors of a computer system, cause the computer system to:

receive a first request, the first request specifying a second schema for requested data that is compatible with a computer program, where at least a portion of the requested data represents vertex data;

in response to receiving the first request, obtain from a data store serialized data in a first schema;

generate a determination that the first schema and the second schema are different based at least in part on the first schema being associated with a previous version of the computer program;

based at least in part on the determination, cause a conversion handler to convert the serialized data to the second schema to produce converted serialized data based at least in part on data conversion information specifying one or more operations that produce the converted serialized data based at least in part on the serialized data, where the one or more operations include converting the serialized data in the first schema to at least one intermediate schema prior to converting the serialized data to the second schema to produce converted serialized data;

deserialize the serialized data to produce a run-time data object by at least obtaining the requested data from the serialized data, the requested data used to produce the run-time data object that encodes the vertex data rendered by a graphics processing unit associated with the computer program; and provide the run-time data object associated with the computer program.

14. The non-transitory computer-readable storage medium of claim 13, wherein the instructions that cause the computer system to cause the serialized data to be converted to the second schema to produce the converted serialized data further include instructions that, as a result of being executed, cause the computer system to convert the serialized data to a data tree format.

15. The non-transitory computer-readable storage medium of claim 13, wherein the serialized data is stored together with an indication of the first schema.

16. The non-transitory computer-readable storage medium of claim 13, wherein the data conversion information specifies one or more operations performed on the serialized data to produce the converted serialized data.

17. The non-transitory computer-readable storage medium of claim 13, wherein the instructions further comprise instructions that, as a result of being executed by the one or more processors, cause the computer system to receive a registration message indicating the data conversion information.

18. The non-transitory computer-readable storage medium of claim 17, wherein the registration message specifies that the data conversion information includes information that converts data from the first schema to the second schema.

19. The non-transitory computer-readable storage medium of claim 13, wherein the first request is received in response to initiating run-time execution of the computer program.

20. The non-transitory computer-readable storage medium of claim 13, wherein the second schema is specified by one or more instructions of the computer program.

* * * * *